United States Patent [19]
Wang

[11] Patent Number: 5,709,030
[45] Date of Patent: Jan. 20, 1998

[54] GARDEN SHEAR CONTROL MECHANISM

[76] Inventor: Meng Tun Wang, No. 9-4-1, Chung Nan Lane, Tai Ping City, Taichung Hsien, Taiwan

[21] Appl. No.: 743,213

[22] Filed: Nov. 5, 1996

[51] Int. Cl.⁶ .................................................. B26B 13/00
[52] U.S. Cl. ............................................. 30/251; 30/249
[58] Field of Search .......................... 30/244, 245, 249, 30/250, 251, 252, 258, 92, 94

[56] References Cited

U.S. PATENT DOCUMENTS

| | | | |
|---|---|---|---|
| 331,787 | 12/1885 | Harlow | 30/94 |
| 4,084,317 | 4/1978 | Nakamura et al. | 30/251 |
| 4,602,432 | 7/1986 | Vosbikian | 30/258 |
| 5,020,222 | 6/1991 | Gosselin et al. | 30/251 |
| 5,159,757 | 11/1992 | Weid et al. | 30/251 |
| 5,511,314 | 4/1996 | Huang | 30/251 |

*Primary Examiner*—Hwei-Siu Payer
*Attorney, Agent, or Firm*—Charles E. Baxley, Esq.

[57] ABSTRACT

A garden shear includes a cutting blade formed on a lever. A plate is pivotally coupled to the lever and has a cutting blade for acting with that of the lever. The plate includes one or more engaging notches formed opposite to the cutting blade. A beam is pivotally coupled to the lever and can be moved toward and away from the lever. A hook is pivotally coupled to the beam for engaging with the plate and for moving the cutting blades away from each other. An arm is pivotally coupled to the beam and includes one end for engaging with the engaging notches and for allowing the cutting blades to be moved toward each other step by step.

8 Claims, 7 Drawing Sheets

GARDEN SHEAR CONTROL MECHANISM

BACKGROUND OF THE INVENTION

1. Field of the Invention

The present invention relates to a shear, and more particularly to a garden shear control mechanism.

2. Description of the Prior Art

Typical garden shears comprise a pair of levers pivotally coupled together at a middle portion so as to form a pair of cutting blades on one end and a pair of handles on the other end for operating the cutting blades. When cutting a branch of large diameter, the handles have to be forced toward each other and separated from each other for several times so as to allow the cutting blades to cut the branch off the tree. This kind of garden shears may not be easily operated by women and children.

The present invention has arisen to mitigate and/or obviate the afore-described disadvantages of the conventional garden shears.

SUMMARY OF THE INVENTION

The primary objective of the present invention is to provide a garden shear having a control mechanism for allowing the handles to operate the cutting blades without disengaging the cutting blades from the branch.

In accordance with one aspect of the invention, there is provided a garden shear comprising a lever including a first end having a first cutting blade provided therein and including a second end having a handle provided therein, the lever including a middle portion, a plate including a middle portion pivotally coupled to the middle portion of the lever and including a first end having a second cutting blade for acting with the first cutting blade and for cutting a branch, the plate including a second end having at least one engaging portion provided therein, a beam including a first end having a handle provided therein and including a second end pivotally coupled to the first end of the lever for allowing the beam to be moved toward and away from the lever, means for moving the second cutting blade away from the first cutting blade, and an arm pivotally coupled to the beam and including an actuating end for engaging with the engaging portion of the plate and for allowing the arm to force the second cutting blade toward the first cutting blade when the beam is moved toward the lever.

The lever includes a projection provided in the first end for engaging with the beam and for limiting a rotational movement of the beam relative to the lever. A biasing means is provided for biasing the actuating end of the arm to engage with the engaging portion of the plate.

The plate includes at least two engaging portions for engaging with the actuating end of the arm and for allowing the second cutting blade to be moved toward the first cutting blade step by step. The second end of the plate includes a stud provided thereon, the moving means includes a bar pivotally coupled to the beam, the bar includes a hook for engaging with the stud and for allowing the plate to be moved by the beam.

The bar includes a stop formed thereon, the hook is pivotally coupled to the bar, and the bar includes means for biasing the hook to hook the stud, the stop is engaged with the hook for limiting a rotational movement between the hook and the bar. The hook includes a tapered surface for engaging with the stud and for allowing the hook to be disengaged from the stud when the beam is moved toward the lever. The beam includes means biased between the bar and the beam for pulling the bar toward the beam. The beam includes a protrusion provided thereon for engaging with the bar and for moving the hook to engage with the stud.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
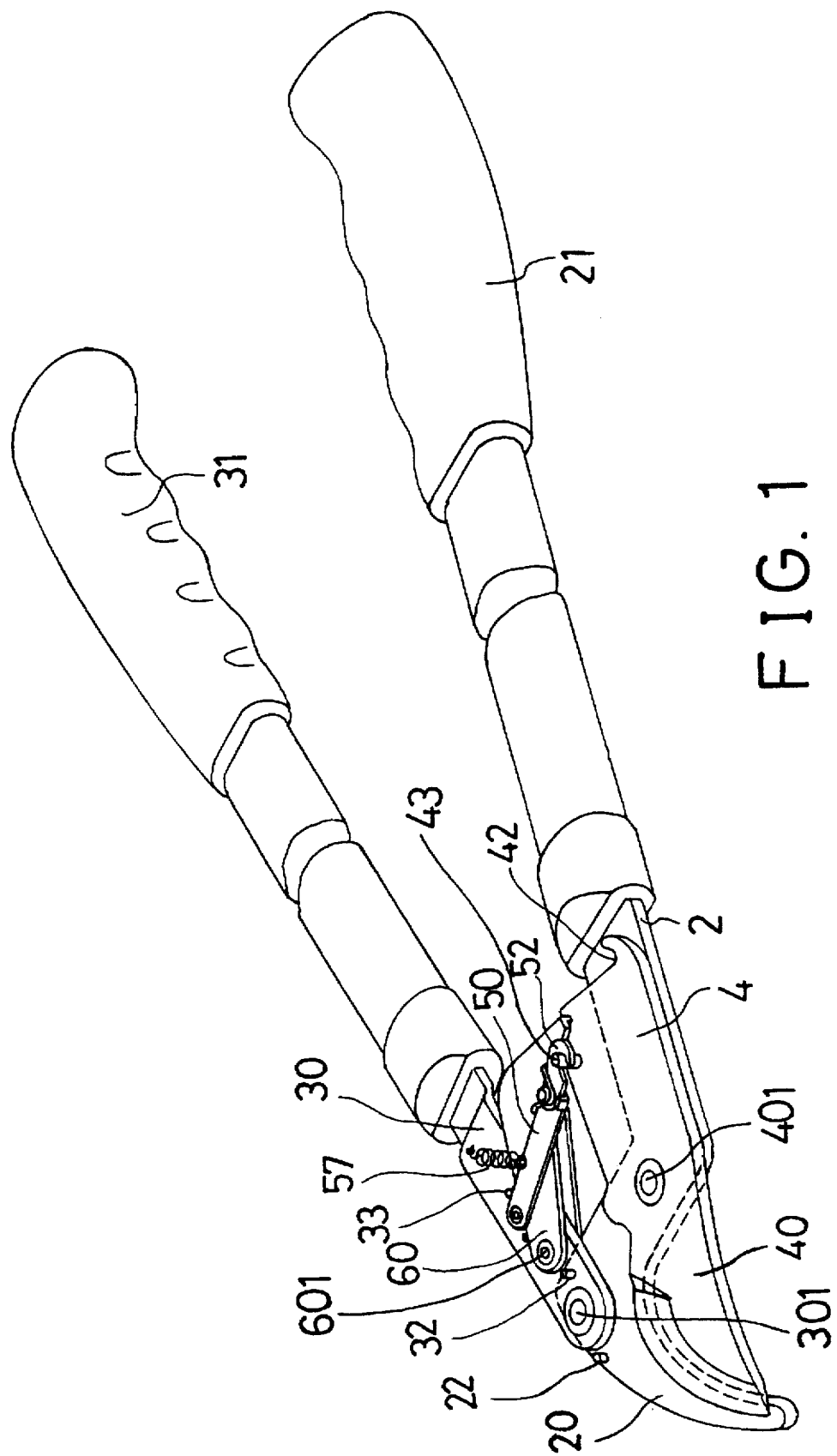
FIG. 1 is a perspective view of a garden shear in accordance with the present invention.
Figure 2:
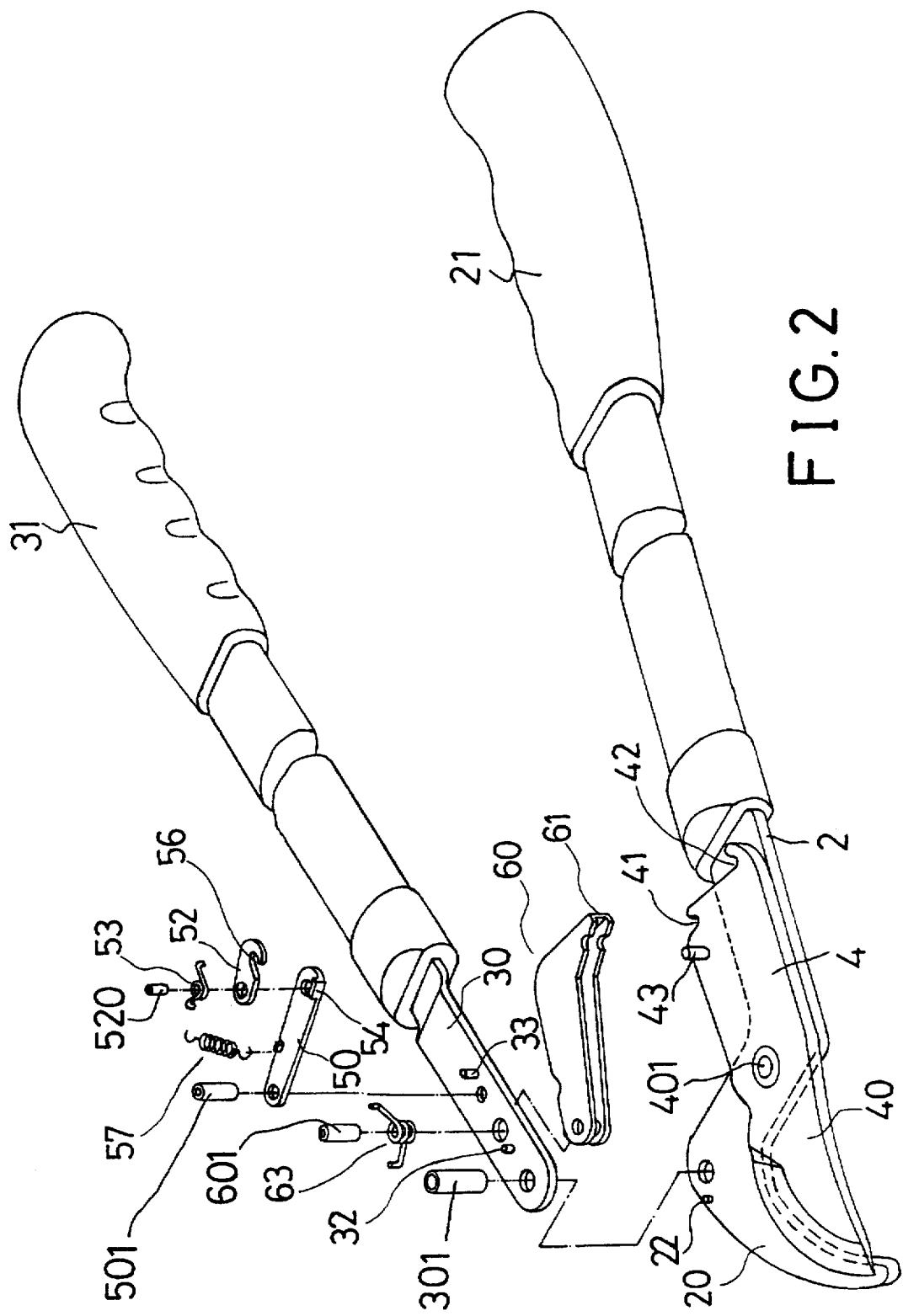
FIG. 2 is an exploded view of the shear.
Figure 3:
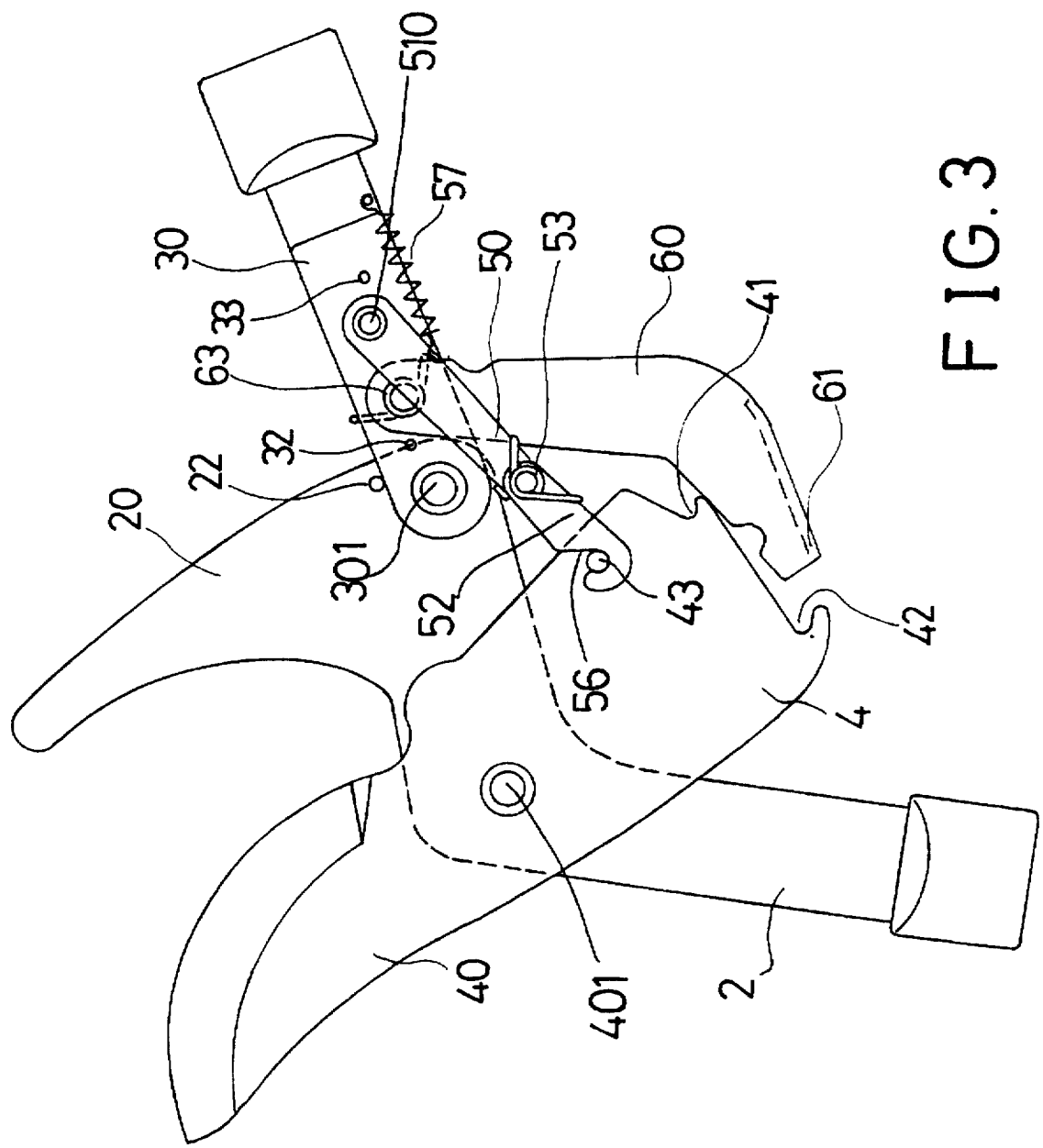
FIGS. 3, 4, 5, 6, 7 are plane views illustrating the operation of the garden shear.

Referring to the drawings, and initially to FIGS. 1 to 3, a garden shear in accordance with the present invention comprises a lever 2 including a cutting blade 20 provided in one end and including a handle 21 provided in the other end. A projection 22 is provided in the one end of the lever 2. A plate 4 has a middle portion pivotally coupled to the lever 2 at a pivot pin 401 and has a cutting blade 40 formed in one end for acting with the cutting blade 20 so as to cut twigs and branches. The plate 4 includes two engaging portions 41, 42, such as projections or notches formed in the other end and includes a stud 43 provided thereon.

Figure 4:
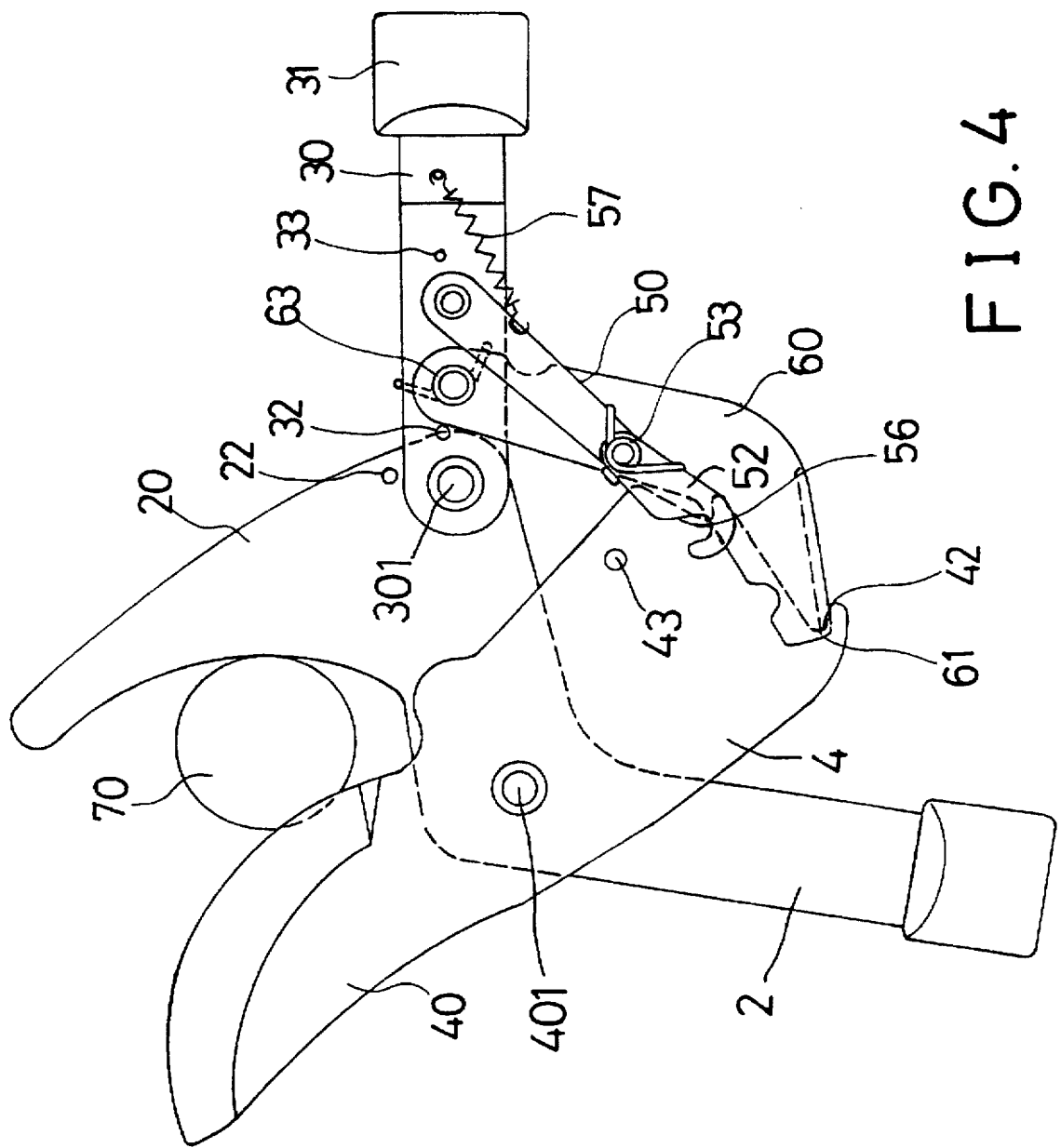
Figure 5:
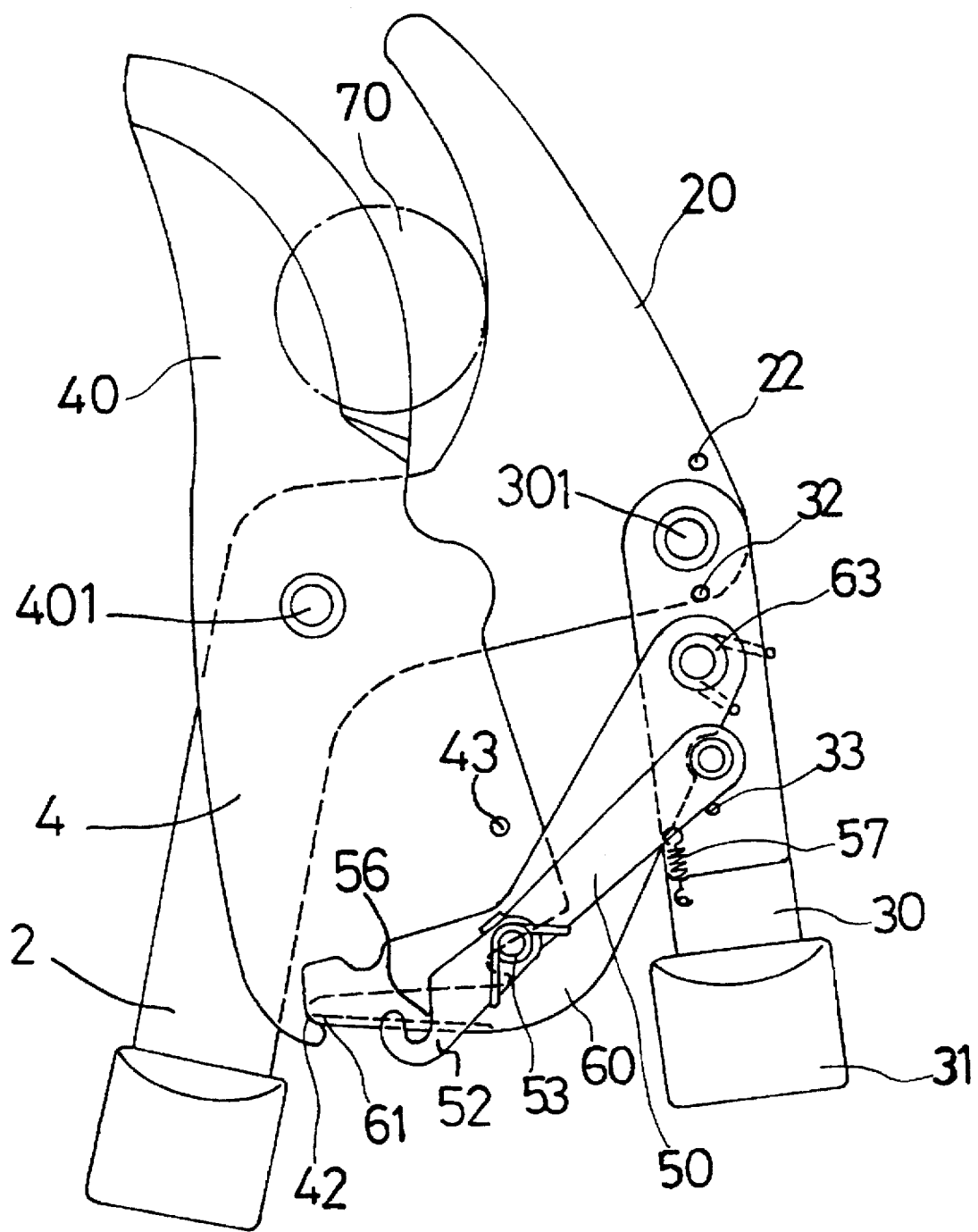
Figure 6:
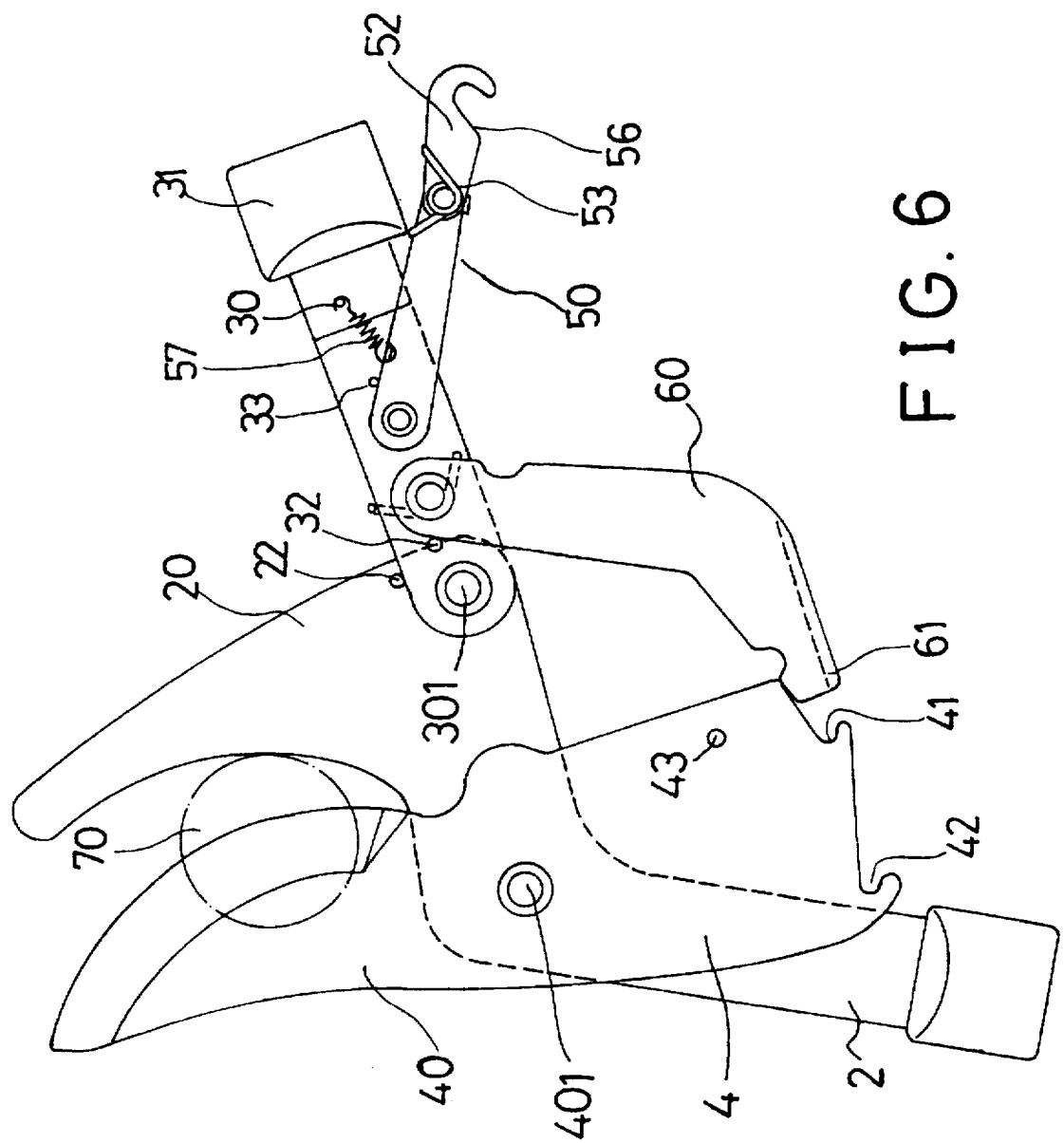
Figure 7:
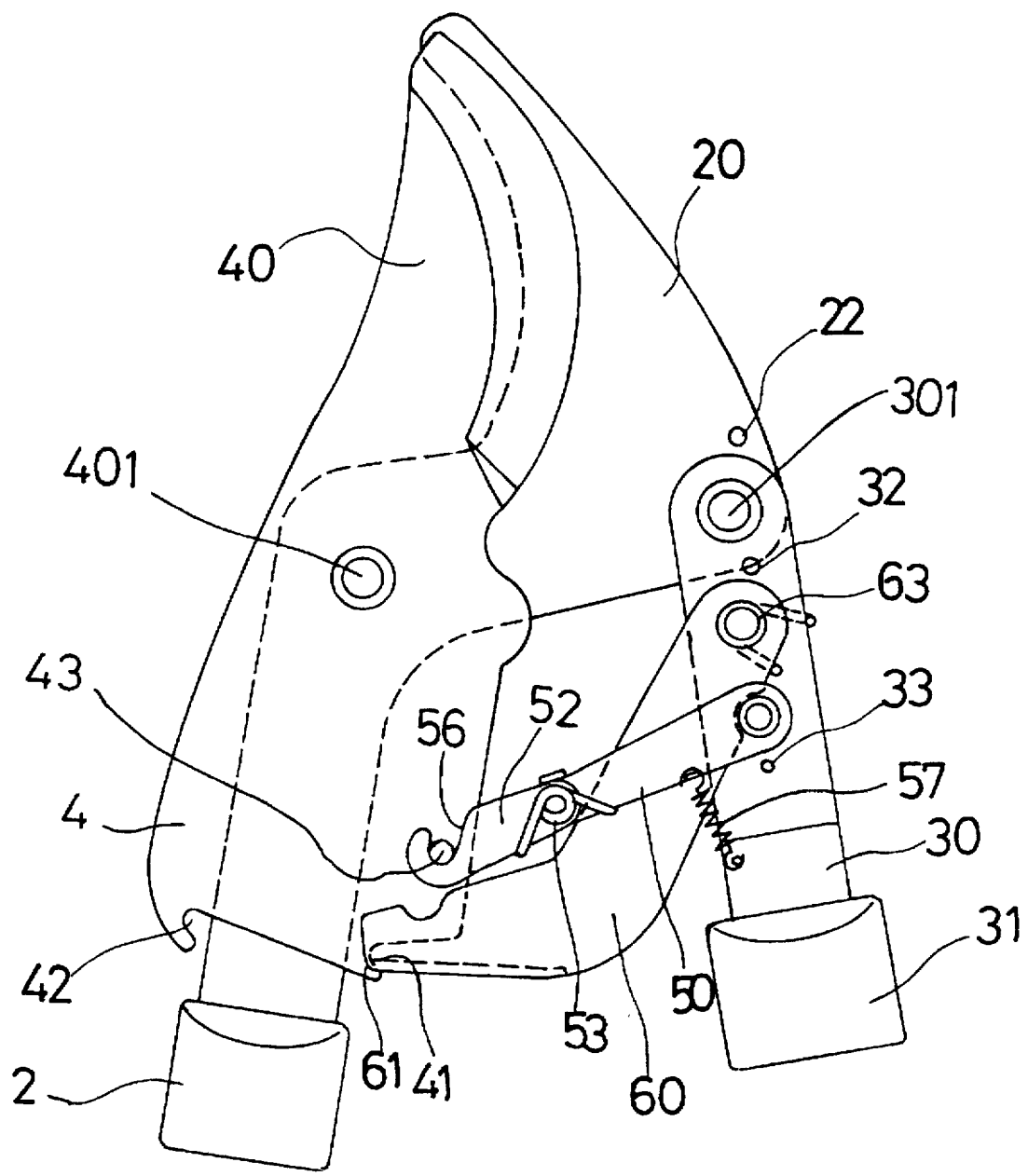

A beam 30 includes a handle 31 provided in one end and the other end pivotally coupled to the one end of the lever 2 at a pivot shaft 301 for allowing the beam 30 to be rotated about the pivot shaft 301. The beam 30 includes a protrusion 33. The projection 22 may engage with the beam 30 so as to limit the rotational movement of the beam 30 relative to the lever 2 (FIGS. 3, 4 and 6). An arm 60 has one end pivotally coupled to the one end of the beam 30 by a pivot pin 601 and has an actuating end 61 provided on the other end. A spring 63 is engaged on the pin 60 for biasing the actuating end 61 of the arm 60 to engage with either of the notches 41, 42 of the plate 4 (FIGS. 3-7). The beam 30 includes a bulge 32 for engaging with the arm 60 and for limiting the rotational movement of the arm 60 relative to the beam 30 (FIGS. 4 and 6). A bar 50 has one end pivotally coupled to the beam 30 by a pivot pin 510 and includes a stop 54 formed in the other end. A hook 52 is pivotally coupled to the other end of the bar 50 by a pivot pin 520 (FIG. 2). A spring 53 is engaged on the pivot pin 520 for biasing the hook 52 to hook the stud 43 (FIGS. 3 and 7). The hook 52 includes a tapered surface 56 for allowing the hook 52 to be disengaged from the stud 43 (FIG. 4). The stop 54 may engage with the hook 52 for limiting the relative rotational movement between the hook 52 and the bar 50. A spring 57 couples the bar 50 to the beam 30 for pulling the bar 50 toward the beam 30.

In operation, as shown in FIG. 3, when the hook 52 is engaged with the stud 43 and when the beam 30 is rotated away from the lever 2, the cutting blade 40 may be moved away from the cutting blade 20 by the hook 52 and the bar 50. As shown in FIG. 4, when the beam 30 is moved toward the lever 2, the actuating end 61 of the arm 60 is caused to engage with the notch 42 of the plate 4 such that the cutting blade 40 may be forced toward the other cutting blade 20 for cutting the branch 70. At this moment, the hook 52 is disengaged from the stud 43 by the tapered surface 56. As shown in FIG. 5, when the cutting blade 40 cut into and may cut into only about half of the branch 70, the arm 60 may be pulled by the beam 30 to engage with the other notch 41 of the plate 4 (FIG. 6), such that the cutting blade 40 may further be forced to cut the branch 70 completely. After the branch 70 is cut off and when the beam 30 is moved further toward the lever 2, the protrusion 33 may engage with the bar 50 so as to engage the hook 52 with the stud 43 (FIG. 7), such that the cutting blade 40 may be moved away from the cutting blade 20 again when the beam 30 is moved away from the ever 2 (FIG. 3).

It is to be noted that two or more notches 41, 42 may be provided in the plate 4 for allowing the cutting blade 40 to be moved gradually toward the other cutting blade 20 and for allowing the garden shear to cut the branch step by step.

Accordingly, the garden shear in accordance with the present invention includes a cutting blade 40 that may be forced to cut the branch 70 step by step, such that the user may spend less energy to cut the branch 70 and such that the garden shear is good to be operated by women and children.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A garden shear comprising:

a lever including a first end having a first cutting blade provided therein and including a second end having a handle provided therein, said lever including a middle portion, a plate including a middle portion pivotally coupled to said middle portion of said lever and including a first end having a second cutting blade for acting with said first cutting blade and for cutting a branch, said plate including a second end having at least one engaging portion provided therein, said second end of said plate including a stud provided thereon, a beam including a first end having a handle provided therein and including a second end pivotally coupled to said first end of said lever for allowing said beam to be moved toward and away from said lever, means for moving said second cutting blade away from said first cutting blade, said moving means including a bar pivotally coupled to said beam, said bar including a hook for engaging with said stud and for allowing said plate to be moved by said beam, and an arm pivotally coupled to said beam and including an actuating end for engaging with said engaging portion of said plate and for allowing said arm to force said second cutting blade toward said first cutting blade when said beam is moved toward said lever.

2. A garden shear according to claim 1, wherein said lever includes a projection provided in said first end thereof for engaging with said beam and for limiting a rotational movement of said beam relative to said lever.

3. A garden shear according to claim 1 further comprising means for biasing said actuating end of said arm to engage with said engaging portion of said plate.

4. A garden shear according to claim 1, wherein said plate includes at least two engaging portions for engaging with said actuating end of said arm and for allowing said second cutting blade to be moved toward said first cutting blade step by step.

5. A garden shear according to claim 1, wherein said bar includes a stop formed thereon, said hook is pivotally coupled to said bar, and said bar includes means for biasing said hook to hook said stud, said stop is engaged with said hook for limiting a rotational movement between said hook and said bar.

6. A garden shear according to claim 5, wherein said hook includes a tapered surface for engaging with said stud and for allowing said hook to be disengaged from said stud when said beam is moved toward said lever.

7. A garden shear according to claim 6, wherein said beam includes means biased between said bar and said beam for pulling said bar toward said beam.

8. A garden shear according to claim 1, wherein said beam includes a protrusion provided thereon for engaging with said bar and for moving said hook to engage with said stud.

* * * * *